United States Patent
Gusmano et al.

(10) Patent No.: US 7,528,997 B2
(45) Date of Patent: May 5, 2009

(54) SYSTEMS AND METHODS FOR STREAK DETECTION IN IMAGE ARRAY SCANNING

(75) Inventors: Donald J. Gusmano, Henrietta, NY (US); Jagdish C. Tandon, Fairport, NY (US); Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1102 days.

(21) Appl. No.: 10/740,493

(22) Filed: Dec. 22, 2003

(65) Prior Publication Data

US 2005/0135709 A1    Jun. 23, 2005

(51) Int. Cl.
H04N 1/04     (2006.01)
G06K 15/00    (2006.01)

(52) U.S. Cl. ............... 358/474; 358/1.12; 358/486; 358/463

(58) Field of Classification Search ........... 358/474, 358/1.12, 486, 463, 465, 406, 504, 505; 399/98–106; 250/208.1, 234, 559.4; 382/275, 274
See application file for complete search history.

(56) References Cited

U.S. PATENT DOCUMENTS

| | | | |
|---|---|---|---|
| 5,570,161 A | * | 10/1996 | Andrews et al. ............ 399/98 |
| 6,025,589 A | * | 2/2000 | Aswell et al. ........... 250/208.1 |
| 6,188,465 B1 | | 2/2001 | Rees et al. |
| 6,465,801 B1 | * | 10/2002 | Gann et al. ............. 250/559.4 |
| 6,600,579 B1 | * | 7/2003 | Kumagai et al. ........... 358/474 |
| 6,618,173 B1 | * | 9/2003 | Nobel et al. .............. 358/513 |
| 6,839,153 B1 | * | 1/2005 | Shimizu .................... 358/1.12 |
| 6,937,361 B1 | * | 8/2005 | Kondo et al. .............. 358/486 |
| 7,072,075 B2 | * | 7/2006 | Kondo et al. .............. 358/463 |
| 7,183,532 B2 | * | 2/2007 | Gann ......................... 382/274 |
| 7,408,569 B1 | * | 8/2008 | Yamaguchi ................ 348/125 |
| 2002/0051248 A1 | * | 5/2002 | Cook et al. ................ 358/488 |
| 2002/0158192 A1 | * | 10/2002 | Gann ......................... 250/234 |
| 2004/0057616 A1 | * | 3/2004 | Kondo et al. .............. 382/275 |
| 2007/0109605 A1 | * | 5/2007 | Shimizu .................... 358/463 |

FOREIGN PATENT DOCUMENTS

JP    2002-271631    *    9/2002

OTHER PUBLICATIONS

English translation of JP 2002-271631 (10 pages).*

* cited by examiner

*Primary Examiner*—Houshang Safaipour
(74) *Attorney, Agent, or Firm*—Oliff & Berridge, PLC (57) ABSTRACT

In a system and method for streak detection in a fixed imaging array digital scanning system, redundant information regarding individual lines of a scanned image collected by multiple discrete rows or sets of scanning sensors in the imaging array are compared. Stationary obstructions in the field of view of the imaging array are detected through this comparison which would otherwise appear repeatedly reproduced as streaks or lines in the reproduced output image.

14 Claims, 6 Drawing Sheets

SYSTEMS AND METHODS FOR STREAK DETECTION IN IMAGE ARRAY SCANNING

BACKGROUND OF THE INVENTION

1. Field of Invention

This invention is directed to systems and methods for detecting streaks, such as streaks caused by imperfections in scanning systems that employ linear imaging arrays.

2. Description of Related Art

A variety of systems and methods are conventionally used in digital scanning. Typical scanning systems employ imaging arrays that are stationary with respect to the devices in which they are housed, or which are caused to move relative to a stationary substrate to be scanned. In such systems, constant or variable rate movement is effected between the image to be scanned and the imaging array. The imaging array takes a rapidly sequential series of pictures of the image medium that is presented to be scanned as the relative movement is effected. The scanning system then digitizes the image scanned for storage and/or reproduction.

A difficulty in such systems is that any imperfection in the field of view of the imaging array is repeatedly scanned and digitized. The result is that the reproduced output image from the device will include a streak or line corresponding with the position of the imperfection.

Various exemplary scanning devices employ stationary Full-Width Imager Arrays (FWA) or linear Charge-Coupled Device (CCD) arrays. In such systems in which the imaging arrays are stationary, the arrays are often separated from the image to be scanned by a platen glass or other transparent surface or lens overlying the imaging array. Various exemplary methods are employed in these devices to move the image across the transparent surface. One such exemplary method, commonly referred to as Constant Velocity Transport (CVT) scanning, employs a belt, drum or other like device to move the image substrate to be scanned across a linear sensor, such as, for example, an FWA.

A recognized problem in imaging array scanning systems, such as, for example, CVT scanning devices, occurs when dirt particles, contaminants, imperfections, obstructions and/or other objects appear on the transparent surface, or otherwise in the field of view of the FWA or CCD. Such dirt particle, contaminant, imperfection, obstruction and/or other object remaining stationary on the transparent surface, or otherwise in the field of view over the FWA or CCD, is repeatedly imaged and digitized as though it were part of the scanned image. The result is that the image reproduced by the exemplary CVT scanning device will include a streak or a line on the subsequently reproduced image.

A variety of systems and methods are employed to ensure that the platen glass is kept free of dirt particles, contaminants, imperfections, obstructions and/or other objects. These systems and methods thereby improve reproduced image quality. Many of these methods are manual, requiring visual inspection and manual cleaning of an exemplary system's platen glass. Other systems and methods for improving reproduced output image quality include automated system steps which review the reproduced output image in comparison with the scanned image in order to detect and compensate for differences before the reproduced image is displayed. One complication with this approach is that it is difficult to determine whether a line which is digitized and reproduced as part of the output image is actually part of the image that was scanned or whether it was produced because the FWA or CCD repeatedly scanned any imperfection, stationary in its field of view, and then reproduced it as a line or streak in the reproduced image.

Difficulties in detecting dirt particles, contaminants, imperfections, obstructions and/or other objects are particularly acute as those which commonly produce streaks in conventional and exemplary CVT scanning systems are extremely small. Any dirt particle, contaminant, imperfection, obstruction and/or other object generally large enough to be detected by simple visual inspection is, in general, large enough to be picked up by the scanned image substrate as the scanned image substrate is moved across the platen glass. The dirt particle, contaminant, imperfection, obstruction and/or other object is moved out of the way, swept away with the movement of the substrate being scanned. Dirt particles, contaminants, imperfections, obstructions and/or other objects that are very small, on the other hand, have a greater tendency to adhere more to a platen glass and to resist being swept away by the movement of the image substrate.

Among the systems and methods employed to remove streaks from digital images produced in CVT scanning systems, software algorithms exist that review the stored data which represents an entire scanned image. Such software algorithms apply revisions before reproducing the image on an output display device. A disadvantage in such methods is that full image review algorithms require the scanning of the entire image and storage of the data representing the scanned image before reviewing the data in its entirety and applying necessary revisions. In high speed scanning applications, this requirement to record an entire image and then review and revise that image before reproducing the image has the potential to slow the scanning and reproduction process to an unacceptable level.

SUMMARY OF THE INVENTION

This invention provides systems and methods for detecting dirt particles, contaminants, imperfections, obstructions and/or other objects in the field of view of an imaging array in digital scanning systems.

This invention further provides systems and methods for detecting dirt particles, contaminants, imperfections, obstructions and/or other objects that lead to streaks and lines in the images produced by digital scanning systems.

This invention further provides systems and methods to detect other imperfections in an image scanned by a linear array digital scanning system and to provide inputs to yield clearer digitized images produced by such scanning systems.

In various exemplary embodiments of the systems and methods according to this invention, linear imaging arrays, such as, for example, Full-Width Imager Array (FWA) sensors of Constant Velocity Transport (CVT) scanning systems, contain multiple rows or sets of sensors. In order to detect whether the data scanned by the imaging array is part of the scanned image or is from dirt particles, contaminants, imperfections, obstructions and/or other objects in the field of view of the imaging array, the scanned image is sampled a minimum of two times by separate rows or sets of discrete sensors in the FWA. These at least two samples, though very close together, correspond to separate discrete scan locations, e.g., two or more discrete locations, underlying a platen glass. The separate discrete images thus obtained are then compared. For dirt particles, contaminants, imperfections, obstructions and/or other objects, smaller in size than the spacing between the rows or sets of sensors, data sensed from dirt particles, contaminants, imperfections, obstructions and/or other objects will be present in the image detected by only one row of sensors.

In various exemplary embodiments of the systems and methods according to this invention, discrete images recorded by separate rows or sets of sensors in the imaging array are compared. Data actually present in the scanned image will be seen by more than one row of sensors with some time gap depending on the row spacing. Only data which is recorded by a first row or set of sensors and then verified by a second or subsequent row or set of sensors will be digitized for reproduction.

In various exemplary embodiments of the systems and methods according to this invention, when differences are detected in the images scanned by separate rows or sets of sensors in the imaging array, an image revision method or device is included in the system to discard, nullify or otherwise revise the digitized data of the reproduced image for the differences between the scanned images as recorded by the separate rows or sets of sensors.

In various exemplary embodiments of the systems and methods according to this invention, a single dirt particle, contaminant, imperfection, obstruction and/or other object large enough to cover multiple rows or discrete sets of sensors can also be detected. In such instances, the detection methodology does not differentiate between an image that overlies one row but does not overlie another. Rather, because dirt particles, contaminants, imperfections, obstructions and/or other objects are not generally symmetric, the presentation to separate rows or sets of sensors is different. An appropriate revision method or device can detect minimal differences between the images presented to separate rows or sets of sensors and provides the input data necessary for revisions to the reproduced image.

In various exemplary embodiments of the systems and methods according to this invention, redundant information recorded by individual rows or sets of sensors in an imaging array is compared in order to increase image fidelity and image integrity in the reproduced image.

In various exemplary embodiments, the systems and methods according to this invention enable a self-diagnostic problem-addressing capability in digital scanning devices and like multi-function machines.

These and other features and advantages of the disclosed embodiments are described herein, or apparent from, the following detailed description of various exemplary embodiments of the systems and methods according to this invention.

BRIEF DESCRIPTION OF THE DRAWINGS

Various exemplary embodiments of the systems and methods according to this invention will be described, in detail, with reference to the following figures, wherein.

DETAILED DESCRIPTION OF EXEMPLARY EMBODIMENTS

The following description of various exemplary embodiments of streak detection systems and methods according to this invention may refer to and/or illustrate one specific type of digital imaging array scanning device, a CVT scanning device for the sake of clarity and familiarity. However, it should be appreciated that the principles of this invention, as outlined and/or discussed below, can be equally applied to any known or later-developed system that records or reproduces images using an imaging array with multiple discrete rows or sets of sensors beyond the CVT scanning device specifically discussed herein.

Various exemplary embodiments of the systems and methods according to this invention enable streak detection by comparing data recorded by each of a plurality of discrete rows or sets of sensors in an imaging array, such as, for example, a Full-Width Imager Array (FWA), as found in, for example, scanners, copiers, facsimile machines and/or other digital imaging devices.

In various exemplary embodiments, dirt particles, contaminants, imperfections, obstructions and/or other objects, which remain stationary on any transparent medium or surface through which the imaging array scans the presented image, or on the surface of the imaging array itself, or that appear otherwise in the field of view of the imaging array, are detected as non-image data by comparing at least two of a sets of positionally redundant image data recorded separately by each of a plurality of discrete rows or sets of sensors in an imaging array.

In various exemplary embodiments of the systems and methods according to this invention, the system or method for streak detection is applied to currently available imaging array scanning devices without physical modification of such imaging arrays. An exemplary linear imaging arrays contain a plurality of discrete rows or sets, often, for example, four rows, of sensors, generally referred to as photosites, each designed to filter out a certain color or combination of colors. The rows are thus commonly identified by the colored filter with which they are fitted in order to filter that color, i.e., blue, green and red. A fourth row, typically, contains no filter and is referred to alternatively as a monochrome, clear, panchromatic, black-and-white or "no-filter" row, substantially included for reproduction of black-and-white text images, often at externally-selectable increased scan rates. Though the discussion presented, and the exemplary embodiments depicted below, will refer to and/or illustrate an FWA with four discrete rows as outlined above, additional rows of sensors may be added to increase the distance between such rows, or to increase the positional redundancy available in the scanned image data from a greater number of discrete row inputs. It should be appreciated that, in order for the systems and methods according to this invention to function, as few as two rows or sets of sensors, with spacing between the rows or sets selected for a specific application, in an imaging array, available to provide redundant data for comparison, are adequate.

Figure 1:
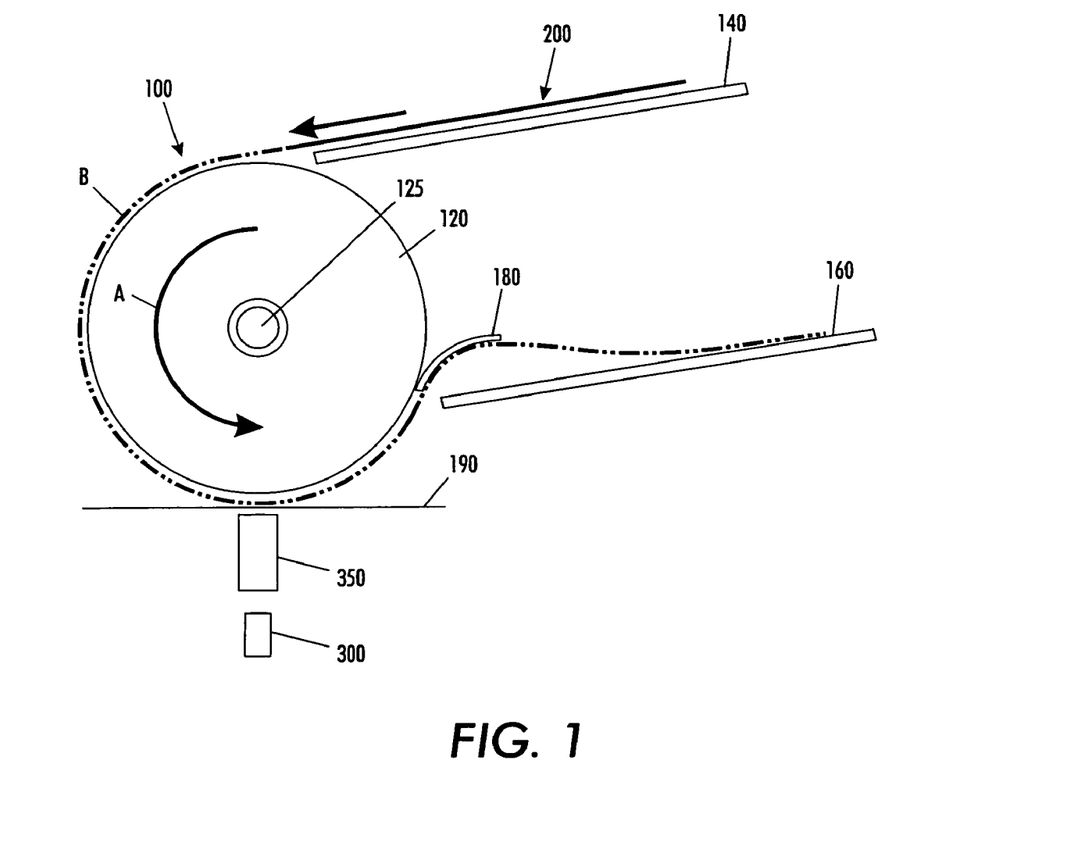
FIG. 1 illustrates an exemplary Constant Velocity Transport (CVT) scanning device usable with various exemplary embodiments of the systems and methods according to this invention.

FIG. 1 illustrates an exemplary Constant Velocity Transport (CVT) scanning device 100 usable with various exemplary embodiments of the systems and methods according to this invention. As shown in FIG. 1, an exemplary embodiment of a CVT scanning device 100 contains a constant velocity transport device 120, depicted in FIG. 1 as a drum, which moves at a constant velocity in direction A about a spindle 125.

A feed tray 140 holds one or more image-bearing substrates 200 to be scanned. Image-bearing substrates such as, for example, pages of paper containing text or other images, are individually presented to the constant velocity transport device 120, also referred to below as a "CVT drum 120," from the document feeder 140. The individual image-bearing substrate 200 to be scanned is transported by the CVT drum 120 along path B as the CVT drum 120 rotates in direction A. The individual image-bearing substrate 200 is scanned as it is moved across a platen glass 190 that lies between the CVT drum 120 and the imaging array 300, and often a focusing lens apparatus 350 which underlies the platen glass 190. The scanned image-bearing substrate 200 completes its travel by being peeled from the CVT drum 120 by a baffle device 180, and deposited in an output tray 160.

In various exemplary embodiments of the systems and methods according to this invention, the imaging array 300 scans, digitizes and records the images presented from the image-bearing substrate 200 focused through the lens apparatus 350. As an image-bearing substrate 200 is transported across the platen glass 190 or other transparent element by the CVT drum 120, the imaging array 300 takes a series of rapid, sequential scans of the image. Scanned image data is digitized through systems in the CVT scanning device 100 and stored and/or reproduced as an output image.

Figure 2:
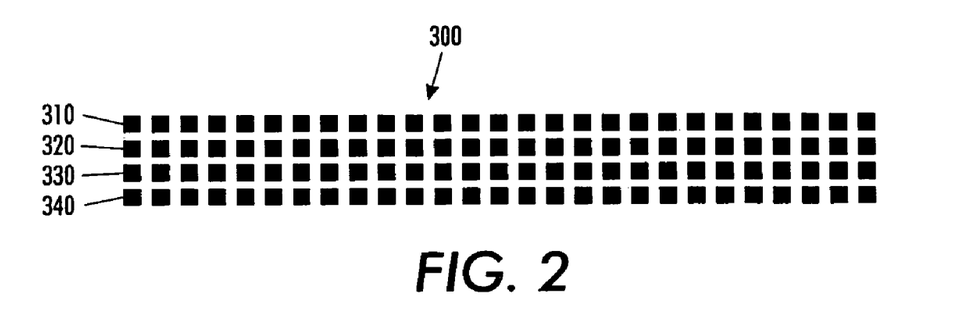
FIG. 2 illustrates a portion of an exemplary Full Width Imager Array (FWA) usable with various exemplary embodiments of the systems and methods according to this invention.

FIG. 2 illustrates a portion of an exemplary Full-Width Imager Array (FWA) 300 usable with various exemplary embodiments of the systems and methods according to this invention. As shown in FIG. 2, an FWA is generally formed of multiple discrete rows of sensors, also known as photosites. It should be appreciated, however, that the systems and methods according to this invention are not limited to strictly linear arrays but rather could be applied to any imaging array with positionally separates sets of sensors that redundantly scan the same image.

In various exemplary embodiments of the systems and methods according to this invention, the FWA includes separate rows or sets of sensors for isolating individual colors for color reproduction. Each individual row or set of sensors is designed to filter out a given color, and the row or set is commonly discussed by reference to the filter located therein. For example, where a row or set of sensors is designated as a blue row, such row or set is intended to pick up all of the details of the image to be scanned, filtering those that are in the spectrum of blue colors. In the exemplary embodiment of the FWA shown in FIG. 2, there is a blue row or set 310, a red row or set 320, a green row or set 330 and a monochrome row or set 340, alternatively referred to as a clear, panchromatic, black-and-white or "no-filter" row or set.

In various exemplary embodiments, each row or set of sensors in an exemplary FWA is in a range of 25 µm to 75 µm tall in the scan direction, with a gap between each row of 10 µm to 20 µm. These ranges are exemplary, and typical of conventional FWA systems, and should be considered in no way, limiting. In order to detect dirt particles, contaminants, imperfections, obstructions and/or other objects on the platen glass, or otherwise in the field of view of the FWA, therefore, sampling of the information presented to at least two rows or sets of sensors, such as, for example, the two rows that are displaced farthest from one another, is accomplished. In the exemplary embodiments depicted in FIG. 2, while the information presented to each row or set of sensors could be individually sampled, it is desirable to sample, at least, the information recorded by the blue row or set 310 and the no-filter row or set 340, because, in its simplest form, the detection and image revision system according to this invention seeks to differentiate only between presence or absence of fixed obstructions, digitized as non-image data, in the field of view of a single row or set of sensors in the imaging array.

Figure 3A:
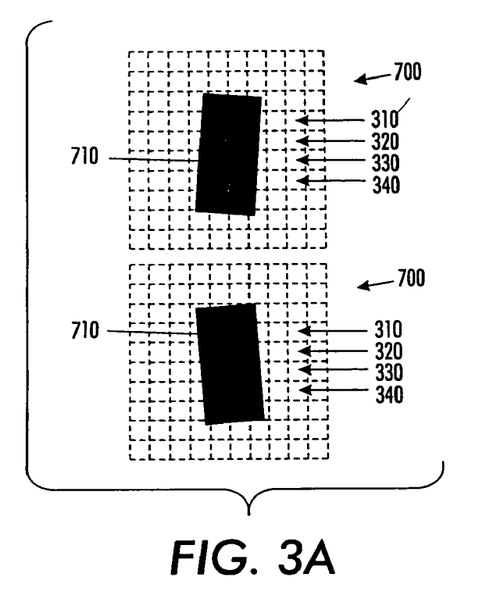
FIGS. 3A-C illustrate exemplary dirt particles, contaminants, imperfections, obstructions and/or other object shapes.
Figure 3B:
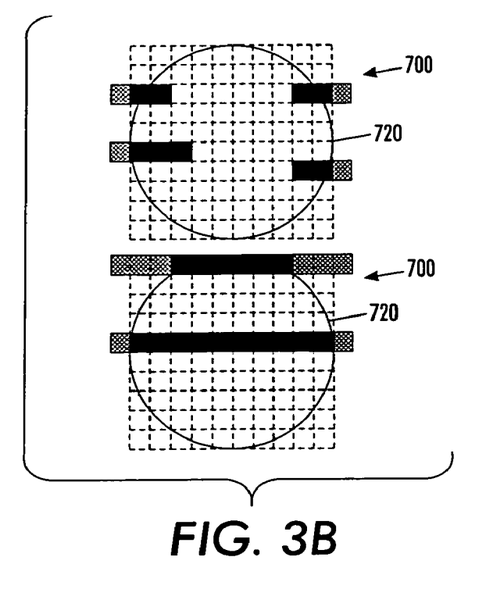
Figure 3C:
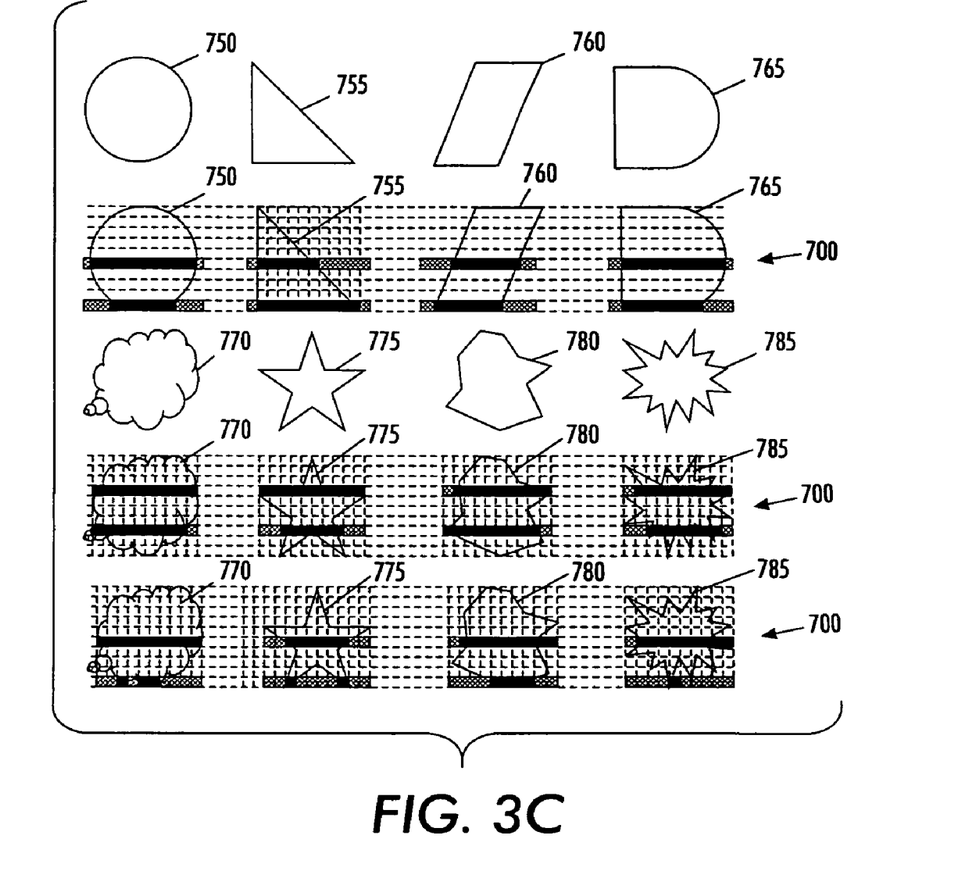

FIGS. 3A-C illustrate exemplary dirt particle, contaminant, imperfection, obstruction and/or other object shapes. As shown in FIGS. 3A-C, such dirt particles, contaminants, imperfections, obstructions and/or other objects may appear over more than one row of sensors. It should be appreciated that the larger the dirt particle, contaminant, imperfection, obstruction, and/or other object in the field of view of the imaging array, the better the potential for it to be swept away with the motion of the image substrate as it is drawn across the platen glass. FIG. 3A shows a simple, substantially rectangular shape 710 overlying a purely illustrative grid 700. Arrows 310/320/330/340 are added to represent exemplary positions of separate rows or sets of sensors, as illustrated in FIG. 2, over which such obstruction may be present. It should be appreciated that, in this case, even though the representative obstruction 710 has an essentially symmetric shape, slight misalignment in its orientation with respect to the underlying imaging array will allow it to be seen differently overall and at its edges by different rows or sets of sensors in the imaging array. FIG. 3B provides another view of a simple shape 720 overlying a representative grid 700. It should be appreciated here that selection of any separate rows or discrete sets of sensors in the representative grid 700, and comparison of the sensed image data from individual sensor positions resident therein, would provide differing data regarding the potentially stationary image and its edges to be compared as well. FIG. 3C illustrates a number of simple to complex shapes 750/755/760/765/770/775/780/785, each of which, if representative of a dirt particle, contaminant, imperfection, obstruction and/or other object overlying multiple rows in a representative array (here depicted as a 10-row array 700), would appear differently overall, or at least at the edges, to the separate rows or sets of sensors when redundantly sensed for comparison.

In more complex exemplary applications, the streak detection and image revision systems according to this invention provide the capability, based on characteristic non-symmetry, or detectable edge variations, in the presentation of dirt particles, contaminants, imperfections, obstructions and/or other objects in the field of view of an imaging array, to detect such obstructions, that is digitized as non-image data, which overlie more than one row of sensors but do not present the same image to the different rows or sets of sensors.

Figure 4:
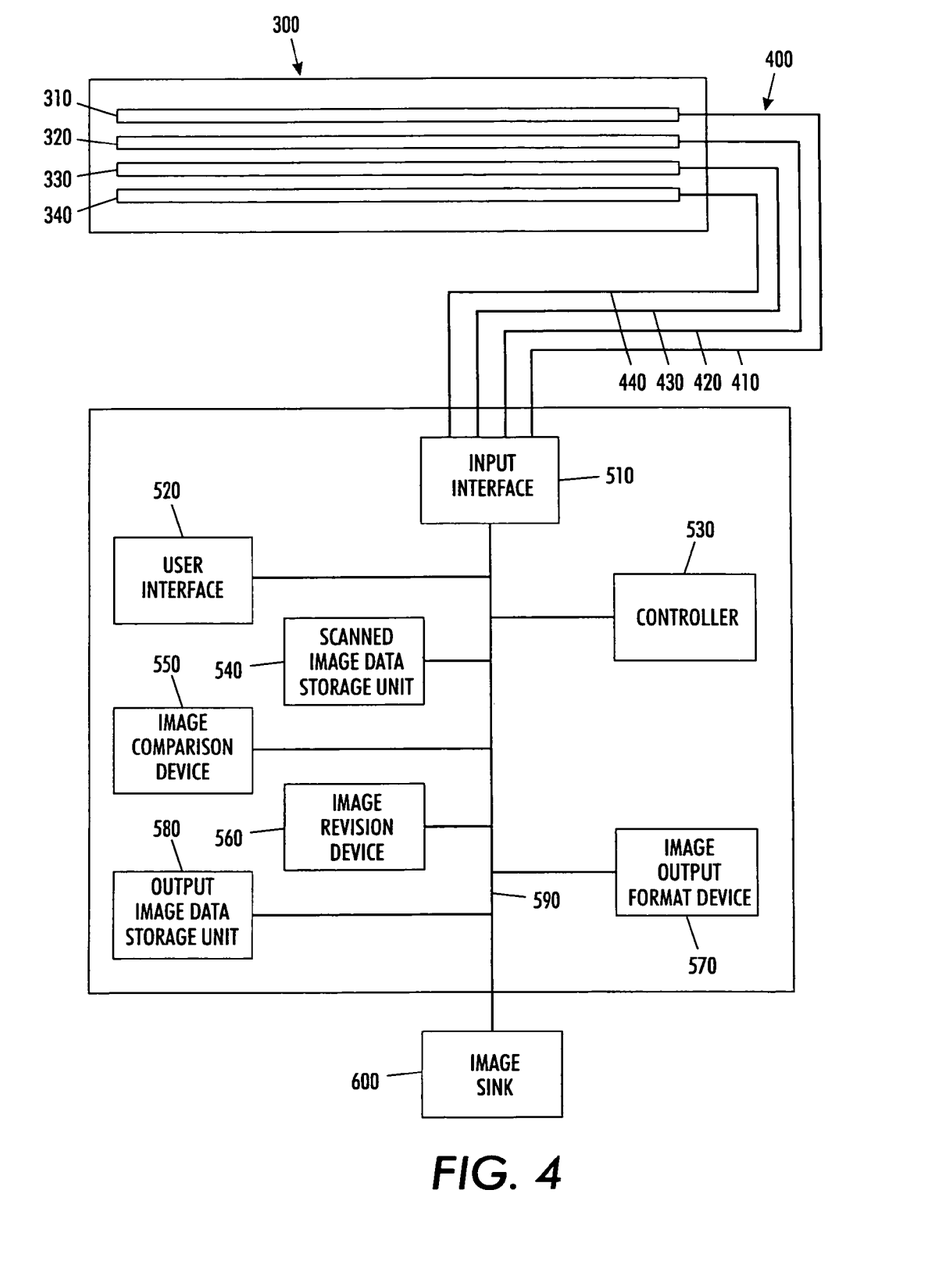
FIG. 4 is a block diagram of one exemplary embodiment of a system for streak detection according to this invention.

FIG. 4 is a block diagram of one exemplary embodiment of a system 500 for streak detection according to this invention. The system 500 includes an automated input interface 510, a user interface 520, a controller 530, a scanned image data storage unit 540, a scanned image data comparison device 550, an image data revision device 560, an image output format device 570 and a reproduced image data storage unit 580 which are interconnected by a data/control bus 590.

The system 500 may be used to implement, for example, the exemplary method for streak detection described below and shown in FIG. 5 under control of the controller 530, which controls the transmission of all data and/or control signals within the system 500. The imaging array 300 scans the image and provides digitally scanned image data through an information bus 400 to an input interface 510 of the system 500.

In various exemplary embodiments of the systems and methods according to this invention, positionally redundant data scanned by a plurality of, depicted in FIG. 4 as four, individual rows or sets of sensors 310/320/330/340 provide a plurality of inputs to the device 500 through individual discrete input lines 410/420/430/440 in the information bus 400, or alternatively through a single line in the information bus 400 wherein discrete input information from separate rows or sets of sensors is sequentially transmitted via the information bus 400, to the input interface 510 of the device 500.

The device 500 includes one or more a scanned image data storage units 540 usable to optionally store discrete image data regarding the scanned image provided separately by each of a plurality of channels, or sequential inputs, corresponding to the plurality of rows or sets of sensors in the imaging array 300. The information input through the input interface 510 of the device 500, whether stored in at least one scanned image data storage unit 540 or not, is normalized in order to revise varying filtering information for each row to facilitate equal comparison and then made available for comparison in a scanned image data comparison device 550, the scanned image data comparison device 550 containing an algorithm to accomplish such comparison.

Should the scanned image data comparison device 550 detect differences between the normalized image data as recorded by separate rows or sets of sensors in the imaging array 300, isolating non-image data, then an image data revision device 560 is provided to modify the image data to revise portions of the digitized information to compensate for the presence of non-image data that would yield streaks in the output image prior to either optionally storing the information in a reproduced image data storage unit 580, or directly formatting the image for output through an image output format device 570 which presents scanned, prepared and/or revised image data properly formatted for output to a data or image sink 600. The data or image sink 600 may be, for example, a substrate on which the image is reproduced as a hard copy reproduction or other display such as, for example, a monitor. In general, the data or image sink 600 can be any device that is capable of outputting or storing the processed image data generated by the systems and methods according to this invention, such as a printer, a copier or other image forming device, a facsimile device, a display device, a memory, or the like.

While FIG. 4 shows the scanned image data comparison device 550 and the image data revision device 560 as integral to the system for streak detection 500, the scanned image data comparison device 550 and the image data revision device 560 may be one or more separate devices containing image comparing and/or revising subsystems. Such exemplary image data comparing and revising subsystems or devices, whether integral to the system for streak detection 500, or individual stand-alone elements, may be implemented as software algorithms, hardware circuits or a combination of the two, standing alone or executed in combination with one another as a single software routine and/or hardware circuit, operating in serial or parallel modes.

In various exemplary embodiments of the systems and methods according to this invention, the data storage units and associated devices can be implemented using any appropriate combinations of alterable, volatile or non-volatile memory, or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

Figure 5:
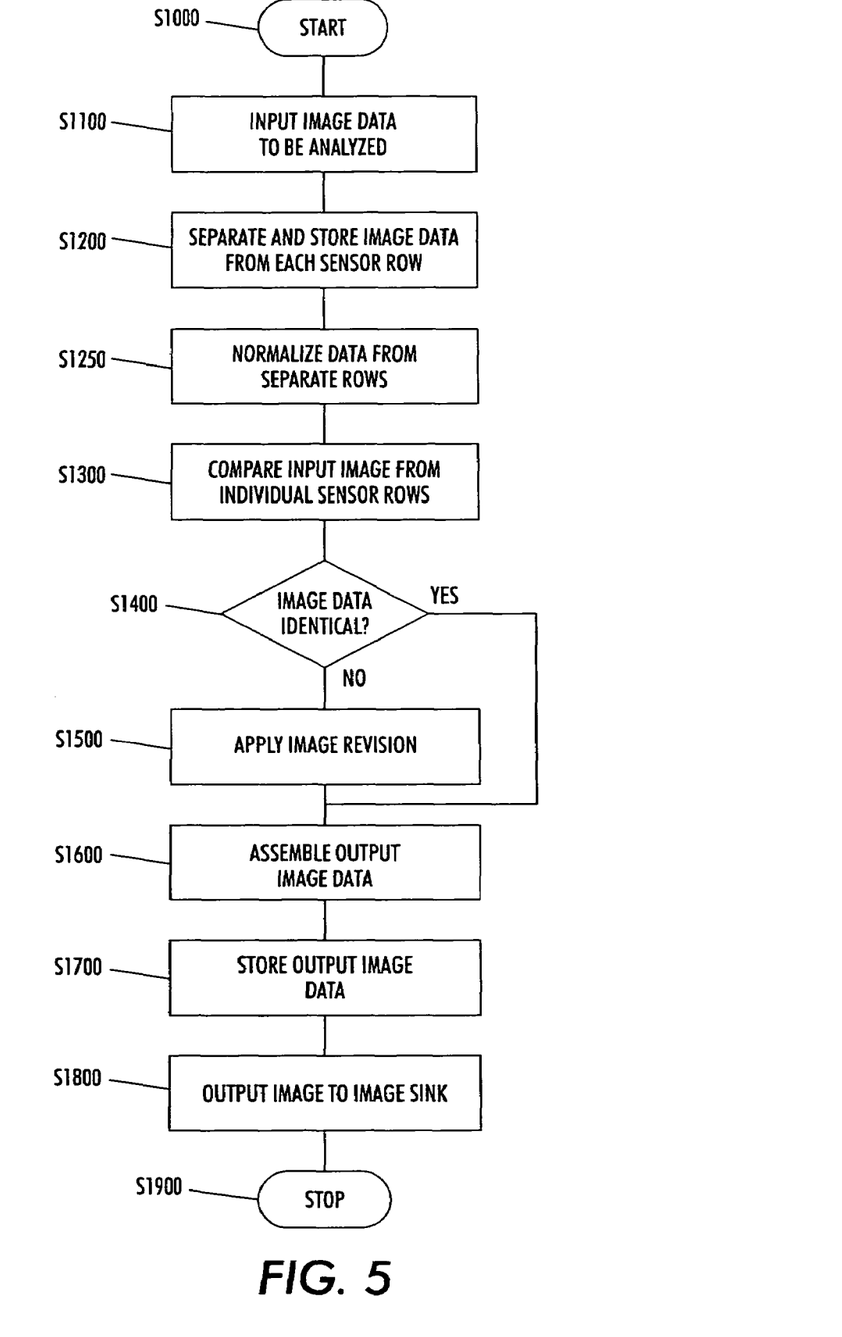
FIG. 5 is a flowchart outlining one exemplary embodiment of a method for streak detection according to this invention.

FIG. 5 is a flowchart outlining one exemplary embodiment of a method for streak detection according to this invention.

As shown in FIG. 5, operation begins at step S1000 and continues to step S1100, where the image data to be analyzed is provided, substantially from an image bearing substrate to an imaging array. The digitized image data includes positionally redundant discrete information from at least two rows or sets of sensors in the imaging array. The operation continues to step S1200.

In step S1200, the discrete image input in step S1100 is separated and stored for a plurality of uses. Such uses include, but are not limited to, holding the data temporarily in order to perform the normalization required below, and optionally, storing the data for non-real time image comparison for streak detection, image revision, image enhancement and/or system calibration. The operation continues to step S1250.

In various exemplary embodiments of the systems and methods according to this invention, real-time image comparison based on the data provided by the separate rows of sensors in the imaging array is accomplished. Where the method includes only real-time comparison, and includes no other requirement or beneficial purpose for storing discrete image data, step S1200 is limited. Regardless of the inclusion of optional storage requirements, a few lines of storage will be required. If the two rows or sets of sensors to be compared contain different colored filtering, e.g., "no-filter" and blue, a normalization step will be involved before comparison between the two rows or sets can be accomplished.

In step S1250, input image data from at least two individual rows or sets of sensors that is to be compared is normalized by revising data from individual rows or sets of sensors containing color filtering. Such a normalization step results in the scanned input image data from separate rows or discrete sets of sensors containing differing filters being made to look the same such that it will be substantially more likely that any detected differences in the image data will be solely the result of dirt particles, contaminants, imperfections, obstructions and/or other objects stationary in the field of view of one or more rows or sets of sensors. Ideally, a no-filter to no-filter comparison, or a comparison of the no-filter row or set of sensors to a combination of data collected from redundant scans by an exemplary group of three separate color filter rows or sets of sensors would improve the results achieved by the systems and methods according to this invention. The operation continues to step S1300.

In step S1300, normalized input image data from at least two individual rows or sets of sensors, for example, the blue filter row or set and the no-filter row or set, in an imaging array is compared. An objective of the comparison of the image data collected from at least two discrete rows or sets of sensors, separated by some distance, is to detect non-image data related to the presence of dirt particles, contaminants, imperfections, obstructions and/or other objects stationary in the field of view of the imaging array, such as, for example, adhering to a platen glass which overlies, and is in the field of view of, the imaging array. Such dirt particle, contaminant, imperfection, obstruction and/or other stationary object, if small enough, will generally appear in the field of view of only one row of sensors. Larger dirt particles, contaminants, imperfections, obstructions and/or other stationary objects, though overlying multiple rows or sets of sensors, can also be detected based on the non-symmetry in their presentation overall and/or at their respective edges across the multiple rows or sets of sensors as shown in FIGS. 3A-C. This comparison step S1300 between discrete data from separate sources that should mirror one another allows for detecting streak causes before the data being formatted for output as a digital image. The operation continues to step S1400.

In step S1400, a determination is made whether the normalized data being compared from at least two rows or sets of sensors in an imaging array is identical, or whether there may be non-image data present. It should be appreciated that step S1400 is implemented using hardware devices, or in the alternative, software algorithms, or any suitable combination of software and hardware, to provide the comparison step. If the determination made in step S1400 is that the normalized data from at least two rows or sets of sensors in an imaging array is identical, the operation continues to step S1600 where the image data is assembled for output.

If the determination made in step S1400 is that the normalized data from at least two rows or sets of sensors in an imaging array is not identical, within any noise limits present in an exemplary system, or the presence of non-image data is detected, the operation continues to step S1500.

In step S1500, image revision is applied compensate for the non-image data associated with stationary dirt particles, contaminants, imperfections, obstructions and/or other objects in the field of view of one or more rows or discrete sets of sensors in the imaging array. If left uncorrected, when the output image data is assembled, a single stationary dirt particle, contaminant, imperfection, obstruction and/or other object in the field of view of one or more rows or sets of sensors in the imaging array would appear in the final output image as a line or streak. In step S1500, non-image data associated with a stationary dirt particle, contaminant, imperfection, obstruction and/or other object is revised in order that the output image will be relatively free of streaks or lines associated with such dirt particles, contaminants, imperfections, obstructions and/or other stationary objects. This step can include interpolation of data from the adjacent pixels without the streak causing obstructions present and/or a comparison of the variations in the edges of detected dirt particles, contaminants, imperfections, obstructions and/or other stationary objects. It should be appreciated that step S1500 is implemented using hardware devices, or in the alternative, software algorithms, or any combination of hardware and software, to provide the revision step. The operation then continues to step S1600.

In step S1600, output image data is assembled for presentation. This step can include formatting the digitized information based on the specific needs of the image sink to be employed. Operation then continues to optional step S1700 or to step S1800.

In optional step S1700, assembled output image data is stored for non-real time use. Such non-real time uses include, but are not limited to, storage for later presentation or optional system calibration operations. Operation then continues to step S1800.

In step S1800, output image data, revised as required based on streak detection, optionally stored for other uses or not, is output to a data or image sink. Operation continues to step S1900 where the operation of the method stops.

In various exemplary embodiments, the systems and methods according to this invention are applicable to myriad devices that record or reproduce images using an imaging array with multiple discrete rows or sets of sensors. Such devices include, but are not limited to, scanners, copiers, facsimile machines digital image scanning devices, digital photocopying devices, xerographic reproduction devices, other digital imaging devices, and/or any image scanning and/or image reproduction devices.

While this invention has been described in conjunction with the exemplary embodiments outlined above, various alternatives, modifications, variations, and/or improvements, whether known or that are, or may be, presently unforeseen, may become apparent. Accordingly, the exemplary embodiments of the invention as set forth above are intended to be illustrative, not limiting. Various changes may be made without departing from the spirit and scope of the invention. Therefore, the systems and methods according to this invention are intended to embrace all known, or later-developed, alternatives, modifications, variations, and/or improvements.

What is claimed is:

1. A system for streak detection in an image scanning device, comprising:
    an imaging array comprising a plurality of rows of positionally discrete sensors;
    a comparison unit that receives image data obtained from each of the plurality of rows of positionally discrete sensors, (1) compares positionally redundant discrete image data obtained from each of the plurality of rows of positionally discrete sensors in the imaging array that has been normalized based on the presence of different filtering elements within the rows of positionally discrete sensors, the comparison unit detecting non-image data by assessing edge variations between the image data collected from each of the rows of positionally discrete sensors to discriminate non-image data that is imaged based on the presence of an obstruction spanning more than one of the plurality of rows of positionally discrete sensors, and (2) compares normalized image data obtained from at least two separate rows of positionally disacrete sensors by comparing image data collected from a transparent or no-filter row of sensors with composite image data from a plurality of rows of color filtered sensors; and
    a transparent element overlying the imaging array, wherein the imaging array is fixed with respect to the overlying transparent element.

2. The system of claim 1, further comprising a transport unit usable to transport an image to be scanned past the imaging array.

3. The system of claim 1, further comprising an image revision unit that applies revisions to image data based on detecting non-image data by the comparison unit.

4. The system of claim 1, further comprising a scanned image data storage unit that stores discrete image data obtained from each of the plurality of rows of positionally discrete sensors in the imaging array.

5. The system of claim 1, further comprising an output image data storage unit that stores revised or unrevised image data formatted for output to an image data sink.

6. An image scanning device including the system of claim 1.

7. A photocopying device including the system of claim 1.

8. A xerographic image reproducing device including the system of claim 1.

9. An image reproducing device including the system of claim 1.

10. A computer-implemented method for streak detection in a scanning device, comprising:
    redundantly scanning an image with at least two separate rows of positionally discrete rows of sensors in an imaging array;
    normalizing the image data collected from each of the at least two separate rows of positionally discrete rows of sensors to account for different filtering elements within the rows of sensors;
    comparing normalized image data collected from each of the at least two separate rows of positionally discrete rows of sensors by comparing image data, collected from a transparent or no-filter row of sensors with composite image data from a plurality of rows of color filtered sensors; and detecting the presence of non-image data in the image data obtained from the at least two separate rows of positionally discrete rows of sensors by detecting edge variations between the image data obtained from the at least two separate rows of positionally discrete rows of sensors to discriminate non-image data that is imaged based on the presence of an obstruction spanning more than one of the at least two rows of positionally discrete rows of sensors.

11. The method of claim 10, further comprising revising the image data to compensate for the non-image data.

12. The method of claim 10, further comprising storing image data collected from the at least two separate rows of positionally discrete rows of sensors.

13. The method of claim 10, further comprising formatting revised or unrevised output image data for output to an image data sink.

14. The method of claim 13, further comprising storing revised or unrevised output image data formatted for output to an image data sink.

* * * * *